United States Patent [19]

Pradal et al.

[11] Patent Number: 4,746,488

[45] Date of Patent: May 24, 1988

[54] HYDRAULIC HOLDING DOWN DEVICE FOR A NUCLEAR FUEL ASSEMBLY

[75] Inventors: Louis Pradal, Lyons; Gérard Chiarelli, Jonage, both of France

[73] Assignee: Framatome, Courbevoie, France

[21] Appl. No.: 890,436

[22] Filed: Jul. 29, 1986

[30] Foreign Application Priority Data

Jul. 29, 1985 [FR] France ............................. 85 11556

[51] Int. Cl.⁴ ........................................... G21C 15/00
[52] U.S. Cl. ...................................... 376/352; 376/365
[58] Field of Search .............. 376/352, 176, 365, 172, 376/174, 439

[56] References Cited

U.S. PATENT DOCUMENTS

| | | | |
|---|---|---|---|
| 3,501,377 | 3/1970 | Germer | 376/365 |
| 3,658,643 | 4/1972 | Spenke | 376/172 |
| 3,736,226 | 5/1973 | Sakurama | 376/352 |
| 3,943,036 | 3/1976 | Ziegler | 376/174 |
| 3,977,439 | 8/1976 | Lambert | 376/352 |
| 4,077,835 | 3/1978 | Bishop et al. | 376/172 |
| 4,352,778 | 10/1982 | Arnaud et al. | 376/352 |

FOREIGN PATENT DOCUMENTS

| | | | |
|---|---|---|---|
| 2030823 | 12/1971 | Fed. Rep. of Germany | 376/352 |
| 1564132 | 8/1973 | Fed. Rep. of Germany | 376/352 |
| 0001787 | 1/1978 | Japan | 376/352 |
| 0112476 | 9/1979 | Japan | 376/365 |
| 0033865 | 8/1984 | Japan | 376/365 |
| 0069595 | 4/1985 | Japan | 376/176 |

Primary Examiner—Harvey E. Behrend
Attorney, Agent, or Firm—Pollock, Vande Sande & Priddy

[57] ABSTRACT

A nuclear reactor has a pressure vessel containing a core supported by the bed-plate. The bed-plate is arranged for admitting an upward flow of coolant into the core. The coolant, generally pressurized water, collects in an outlet plenum. The core comprises fuel assemblies each having a lower end piece. The bed-plate defines an inner volume containing coolant at a pressure lower than the coolant pressure under said bed-plate; the lower end piece of each of said fuel assemblies has a lower extension having a cross-sectional area smaller than the cross-sectional area of the fuel assembly above the bed-plate, cooperating with said bed-plate to define a passage for said flow of coolant into said core; and said extension is surrounded by an annular chamber communicating with said volume and defined by a downwardly facing external surface of said lower end piece.

6 Claims, 4 Drawing Sheets

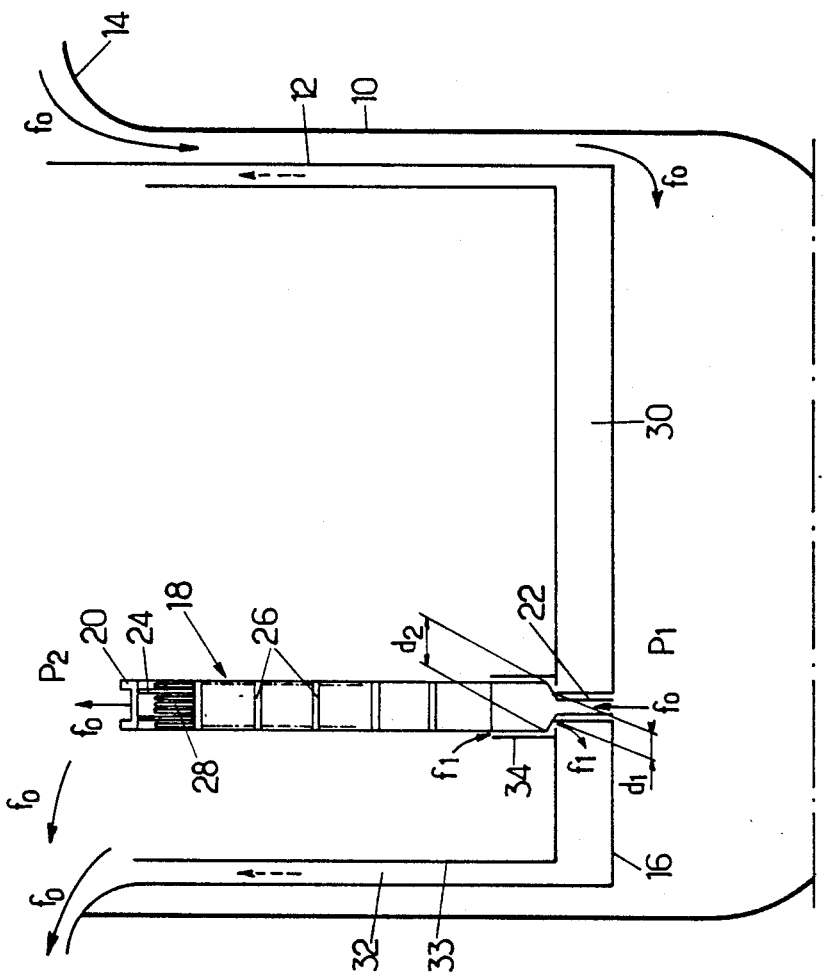

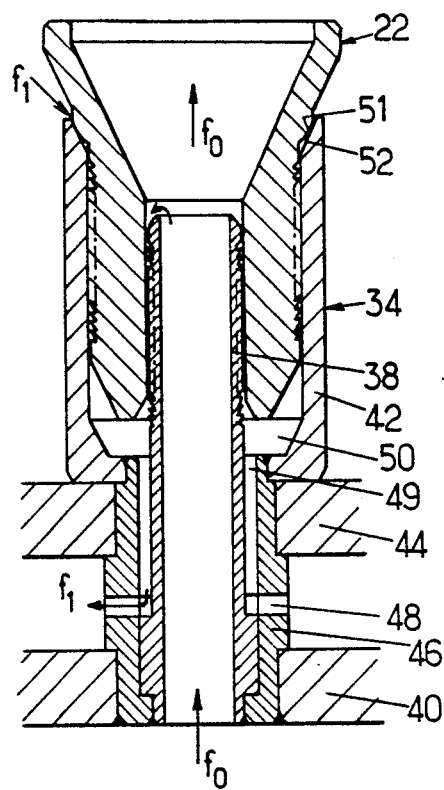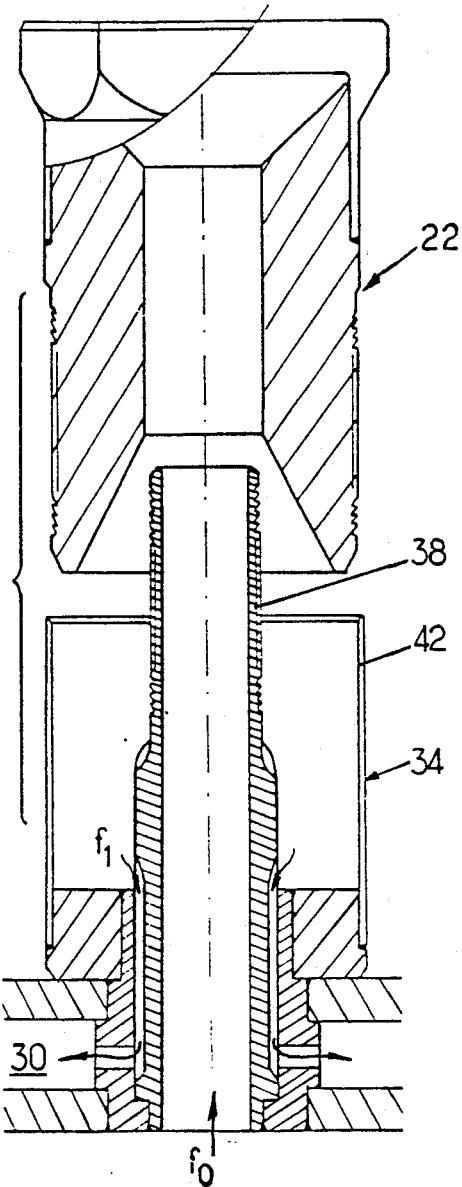

FIG. 3.
FIG. 4.
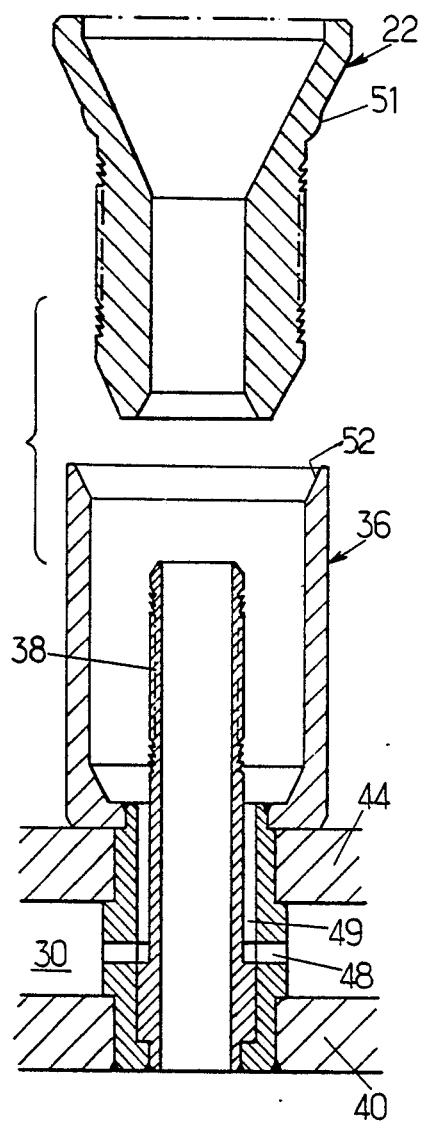
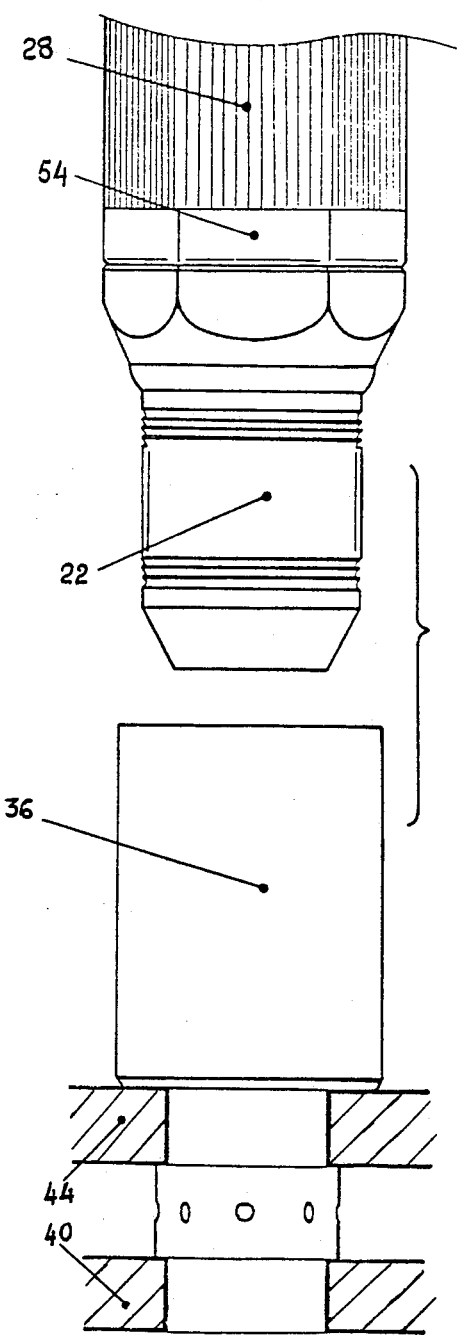

FIG.6
FIG.7
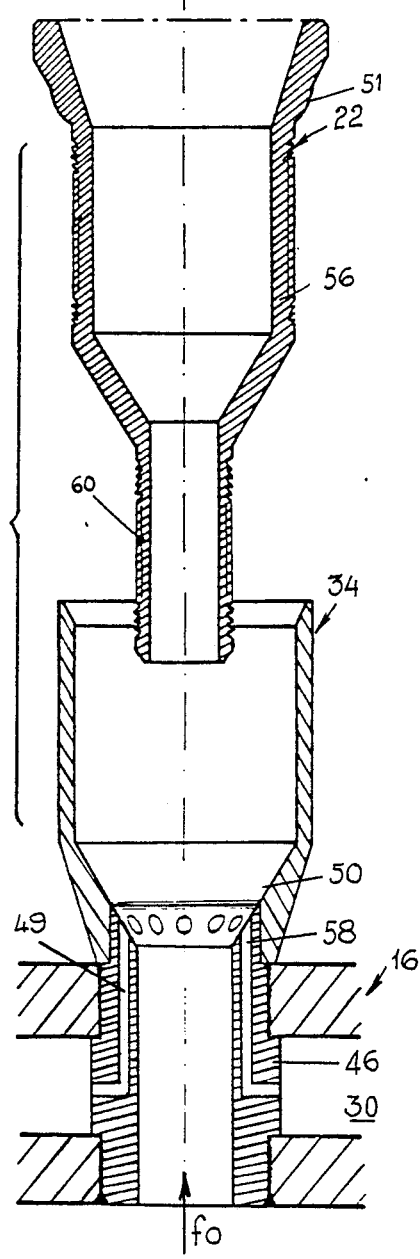
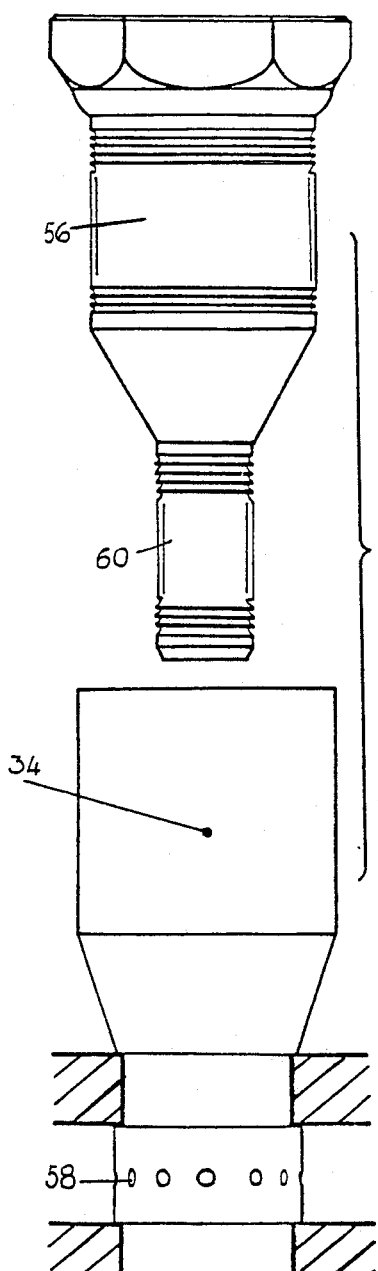

HYDRAULIC HOLDING DOWN DEVICE FOR A NUCLEAR FUEL ASSEMBLY

BACKGROUND OF THE INVENTION

The invention relates to hydraulic holding down devices intended to counteract the lift off of fuel assemblies under the action of the forces exerted thereon by the coolant flowing upwards in the core. These devices are designed for causing the appearance of a hydraulic force directed downwards and exerted on the assemblies, opposing that due to the pressure drop undergone by the coolant when passing through the core or at least a part thereof. It finds a particularly important application. cation in light water cooled and moderated reactors whose assemblies are without a housing.

It relates more particularly to a device for hydraulically holding down a fuel assembly in a nuclear reactor comprising a lower core support plate, fuel assemblies without housing each comprising a bundle of elements held in position by a frame having a foot bearing on the plate and means for bringing the coolant below the plate and collecting the coolant which has flowed through the core in a coolant collector situated above the core, the foot of each assembly comprising a central coolant intake passage connected to the space below the plate, having a section less than the current section of the assembly and surrounded by a space limited by the lower face of an annular zone of the foot connected to the collector.

U.S. Pat. No. 4,174,257 describes a device of this kind which comprises a simple lower core plate. For creating a downward directed pressure force, the foot must define an annular cavity placed in commmunication by the guide tubes with a zone situated above the core. Such an arrangement has numerous drawbacks: the pressure which prevails in the chamber will depend enormously on the pressure loss undergone by the water which penetrates through the orifices during passage through the guide tubes. This pressure drop, very small when the control bars are out of the core, will become very large when they are in the core. So that the hydraulic holding down force remains sufficient when the bars are inserted, it will be necessary to have a very high water flow rate through the guide tubes when the control bars are out of the core. Now, this very high flow rate short circuits the core, lowers the temperature at the outlet of the core and considerably reduces the thermal efficiency.

SUMMARY OF THE INVENTION

It is an object of the invention to provide an improved holding down device, particularly in that it reduces the flow rate variations when passing round the assemblies. To this end it provides a device of the above defined type, whose support plate forms a bed-plate defining an inner volume and said space associated with each assembly is connected to the volume of the bed-plate.

A simple solution consists in creating a leak path having a considerable pressure drop from the core towards the inner volume of the bed-plate, through said space.

The lower pressure may particularly be that which reigns in the coolant collector above the core. It is then sufficient to connect the collector to the inside of the bed-plate.

The invention will be better understood from the following description of devices which form particular embodiments thereof, given by way of non limitative examples.

BRIEF DESCRIPTION OF THE DRAWINGS

FIG. 1 is a general elevational diagram showing the bed-plate of a reactor and a fuel assembly mounted on the bed-plate showing the fitting of the foot in the bed-plate and the parameters which come into play for determining the hold down force, FIG. 2 is an elevational and sectional diagram through a plane passing through the axis of an assembly, FIGS. 3 and 4 show, respectively in section through a vertical plane and in elevation, a first embodiment of the device, FIG. 5, similar to FIG. 3, shows a modified construction, and FIGS. 6 and 7, similar to FIGS. 3 and 4, show another embodiment.

DESCRIPTION OF PREFERRED EMBODIMENTS

The device will now be described implemented in a reactor having a general construction similar to that of pressure water reactors currently used presently. A description of such PWRs may be found for example in the brochure "Centrales Nucléaires EDF de 1300 MWe", EDF, Paris, October 1984.

FIG. 1 shows a fraction of the vessel 10 resisting the pressure of the light water forming the coolant and moderator of a reactor. A casing 12 placed in the vessel separates the downward flow of water arriving through a pipe 14 from the rising flow through the core. The flows are indicated by arrows f0. A lower core plate 16 fast with the casing carries fuel assemblies 18 only one of which is shown. Each fuel assembly comprises a frame formed by an upper end piece 20, a lower end piece with a foot 22, tie rods 24 connecting the end pieces together and grids 26 spaced apart along the tie rods 24. The assembly further includes a bundle of fuel rods 28 spaced apart at the nodes of a regular lattice some nodes of which are occupied by the tie rods 24. The fuel rods are held in position by the grids 26. The coolant enters the assembly through foot 22 and leaves it through the upper end piece 20. The coolant is collected in a plenum and leaves the reactor vessel 10 through an outlet pipe (not shown).

On passing through the assemblies, the coolant, fed at pressure P1 into the reactor through pipe 14, undergoes a head loss which reduces its pressure to a lower value P2 in the collector or plenum.

The arrangement described up to now is conventional. But the construction of the foot assembly is quite different from that of conventional PWR fuel assemblies. For generating a hydraulic hold down force, the device of the invention must cause a low pressure zone to appear under the foot at a pressure less than that which prevails in the assembly. If the assembly is fed axially through a pipe of outer diameter $d_1$ and if the foot is subjected to the low pressure over a zone limited by a circle of diameter $d_2$, the hydraulic holding down force may at most be exerted on an angular zone limited by the circles of diameter $d_1$ and $d_2$ and it will at the most be equal to $$(P_1 - P_0)\frac{\pi}{4}(d_2{}^2 - d_1{}^2),$$

$P_0$ being the reduced pressure available.

The embodiments of the invention which will be described use the bed-plate 16 forming a lower core plate as a pressure well. For that, the bed-plate defines a volume 30 at reduced pressure $P_0$ with respect to the intake pressure $P_1$. A simple solution for obtaining this reduced pressure consists in connecting volume 30 to the outlet collector of the coolant by an annular space or pipes 32 having a low pressure drop: under these conditions, the pressure $P_0$ in the volume 30 is close to $P_2$. The annular space 32 is for example formed between casing 12 and the dividing wall 33 having the form of a core.

The foot has on its side a form such that under an annular surface a pressure close to $P_0$ is created, the difference between the pressure at the low part of the assembly (very close to the pressure $P_1$) and pressure $P_0$ in volume 30 exerting on the foot a downwardly directed force.

In the particular embodiments which will now be described, this result is attained by creating a leak path having a considerable pressure drop (so as to limit the flow rate) from the lower part of the core, where the coolant is at a pressure practically equal to $P_1$, towards a volume 30, the essential part of the pressure drop taking place upstream of a space defined by the lower face of an annular zone of diameter $d_2$ of the foot corresponding to an effective section of action of the pressure representing an appreciable fraction of the total section of the assembly. The leak path, shown schematically by arrows f1 in FIG. 1, is defined by the assembly foot 22 and by a feed device 32 permanently fixed to the bed-plate 16.

In the embodiment shown schematically in FIG. 2, whose component parts are shown separated in FIGS. 3 and 4, the high pressure drop leak path is double. The feed device 34 comprises two coaxial tubes. The internal tube 38 is fixed to the lower plate 40 of the bed-plate and forms a coolant intake passage. The external tube 42 is fixed to the top plate of the bed-plate 44 and serves as support for foot 22. In the construction shown in FIGS. 3 and 4, a socket 46 forming a spacer connects the plates of the bed-plates 44 and 40. The tubes 38 and 42 are not fixed to plates 40 and 44 directly but through the socket 46. This latter is formed with holes communicating the inner volume 30 of the bed plate with the passages 49 formed in the socket 46 and emerging into a space 50.

A first leg of the leak path is defined by the internal tube 38 and the internal bore of the foot of assembly 22. The pressure drop in this leg must correspond to $P_1 - P_0$ for a flow rate which remains acceptable. In order to reach this result without requiring precise centering of foot 22 in device 36, these members are shaped so that the path presents a series of narrow portions and widened portions in a labyrinth. This labyrinth may be formed by leaving the bore of foot 22 smooth and by machining in the upper part of the internal tube 38 a screw thread or circumferential grooves which advantageously have a disymmetrical profile, as shown in FIGS. 2 and 3.

The second leak path is closed when the fuel assembly is correctly bearing on the feed device 36. It has an annular clearance provided between the internal face of tube 42 and the external face of the foot. This path is also provided with a labyrinth, defined by the smooth internal face of tube 42 and the threaded external face of the low part of the foot, cylindrical in shape and of a diameter $d_1$ defining a section appreciably smaller than the cross section of the current part of the assembly and of the top of the foot.

Foot 22 bears on tube 42 in a zone of a diameter close to the outer diameter of tube 42. For this, foot 22 has a spherical part 51 intended to bear on a frustoconical surface 52. This spherical part is connected to an end piece having a polygonal shape, corresponding to the shape of the bundle of rods 28, by a connection zone.

The abutting contact of part 51 on a cone is generally fluid tight and cancels out the leak flow rate from the external labyrinth, which remains however necessary for stability of the device should the assembly rise slightly and to keep in this case a hydraulic holding down force.

It can be seen that the two leak flows are collected in volume 30 then brought back to the outlet of the core through a low pressure drop passage. There is consequently available, under the foot, a pressure difference practically equal to $P1-P0$.

The internal tube 38 ends under the level of the external tube 42, so that it is protected against shocks.

The embodiment which has just been described has advantages: foot 22 is simple in construction and may be machined as a single piece for a forged blank. The length of the foot is practically minimum.

When it is desired to make the hydraulic hold down force maximum, the embodiment shown in FIG. 5 may be substituted for that shown in FIGS. 2 and 4. Referring to FIG. 5, where the parts corresponding to those of the preceding Figures are designated by the same reference number, the external tube 42 consists of a thin sleeve and cannot withstand appreciable radial forces during handling. Then it is necessary that the internal tube 38 has a greater length so that it projects out of sleeve 42 upwards. In some cases, it may be desirable to render access to the internal tube easier for examination and possibly repair a perfectly coaxial assembly of the confronting surfaces of the two tubes may be necessary and difficult to obtain when they are not in a single piece. Then, the arrangement as shown in FIGS. 6 and 7 may be adopted.

Referring to FIGS. 6 and 7, the hold down device again includes the fuel assembly foot 22 and a feed device 34. The leak path has a single leg, with two labyrinths with flows in opposite directions. The first labyrinth comprises a smooth bore of the top part of device 34, of large diameter, and a screw thread machined in the external surface of the upper part 56 of foot 22. A leak flow f1 passes through the labyrinth, then escapes through space 50 and bores 58 in a socket 46 and discharges into the volume 30.

The second labyrinth is defined by a bore in socket 46, having a diameter appreciably less than that of part 34, and a screw thread machined in the lower part 60 of foot 22. This lower part is connected to the top part 56 by a frusto-conical connecting surface which defines space 50 with device 34.

Since the internal surfaces of the cylindrical parts of the feed device 34 are smooth they may be treated, for example by coating with "stellite", so as to have great hardness. The grooves or the screw thread are formed on the foot, that is on a part which is removed with the fuel assembly and may therefore be inspected and repaired easily.

The foot again remains simple and may be formed from a forged blank. Moreover, the feed device 34 may be readily formed as a single piece, rather than in a plurality of pieces as illustrated in FIGS. 6 and 7.

We claim:

1. A nuclear reactor having:
   a pressure vessel;
   a core within said pressure vessel;
   a bed plate supporting said core;
   an outlet plenum located above said core for receiving coolant which has circulated upwardly from under said bed-plate and through said core,
   said core comprising a plurality of upstanding sheathless fuel assemblies each having a bundle of fuel rods carried by a structure consisting of a lower end piece engaged into said bed-plate, an upper end piece, tie rods connecting said upper end piece and lower end piece and grids spaced apart along the tie rods;
   wherein:
   said bed-plate defines an inner volume containing coolant at a pressure lower than the coolant pressure under said bed plate.
   the lower end piece of each of said fuel assemblies has a downwardly directed extension having a cross-sectional area smaller than the cross-sectional area of the fuel assembly above the bed-plate;
   said bed-plate has a plurality of support means each for receiving and supporting one said lower end piece, each defining with a downwardly facing external surface of said lower end piece extension an annular chamber communicating with said volume and surrounding said extension; and
   said bed-plate and lower end piece are formed with aligned vertical passage means for straight unobstructed axial coolant flow without any angular deviation or bends from under said bed-plate into said fuel assembly and with leak means defining a coolant leak path having a first leg from a lower portion of said core to said annular chamber and a second leg from said passage to said annular chamber.

2. A nuclear reactor having:
   a pressure vessel;
   a core within said pressure vessel;
   a bed plate supporting said core;
   an outlet plenum located above said core for receiving coolants which are circulated upwardly through said core,
   said core comprising a plurality of upstanding sheathless fuel assemblies each having a bundle of fuel rods carried by a structure consisting of a lower end piece engaged into said bed plate, an upper end piece, tie rods connecting said upper end piece and lower end piece and grids spaced apart along the tie rods;
   wherein:
   said bed plate defines an inner volume containing coolant at a pressure lower than the coolant pressure under said bed plate;
   the lower end piece of each of said fuel assemblies has a downwardly directed extension having a cross-sectional area smaller than the cross-sectional area of the fue assembly above the bed-plate;
   said bed-plate has a plurality of upwardly directed tubular supports each for receiving and supporting a downwardly directed annular abutment surface of one said lower end piece, each tubular support defining with a downwardly facing pressure action surface of said lower end piece extension an annular chamber surrounding said extension;
   conduit means are formed in said plate for communicating said annular chamber and inner volume;
   said bed-plate and lower end piece are formed with aligned axial vertical passage means for straight vertical unobstructed axial coolant flow without any angular deviation or bends from under said bed-plate into said fuel assembly and with leak means defining a coolant leak path having a first leg from a lower portion of said core to said annular chamber and a second leg from said passage to said annular chamber;
   each said first leg comprises a labyrinth defined by a radially inner surface of tubular support securely connected to said bed-plate and by a radially outer surface of a section of said lower end piece which is lower than said annular abutment surface, said radially inner surface having a horizontal cross-sectional area much greater than the cross-sectional flow area of said passage means, said labyrinth opening into said chamber; and
   wherein one of said radially inner surface and said radially outer surface is smooth while the other of said radially inner surface and said radially outer surface is formed with circumferential grooves or with a helical thread.

3. A nuclear reactor according to claim 1, wherein said first path leg comprises a labyrinth defined by a radially inner surface of an upwardly directed tube securely connected to said bed-plate and by a radially outer surface of a section of said lower end piece extension which is at a lower level than an abutment of said lower end piece on said tube, wherein said radially lower surface has a horizontal cross-sectional area much greater than the cross-sectional flow area of said passage means and wherein said labyrinth opens into said annular chamber.

4. A nuclear reactor according to claim 3, wherein said second leg is defined by an inner cylindrical surface of said lower end extension piece and by a portion of an internal tube fast with said bed-plate and projecting into said lower end piece extension.

5. A nuclear reactor according to claim 3, wherein said secong leg is defined by said extension of said lower end piece which projects into a sleeve traversing said bed-plate and by a smooth inner surface of said sleeve.

6. A nuclear reactor according to claim 3, wherein one of said radially inner surface of said radially outer surface is smooth while the other of said radially inner surface and said radially outer surface is formed with circumferential grooves or with a helical thread.

* * * * *